Aug. 31, 1954  R. R. MERNER  2,688,038
HYDROLYSIS OF METHIONINE NITRILE
Filed Oct. 24, 1952
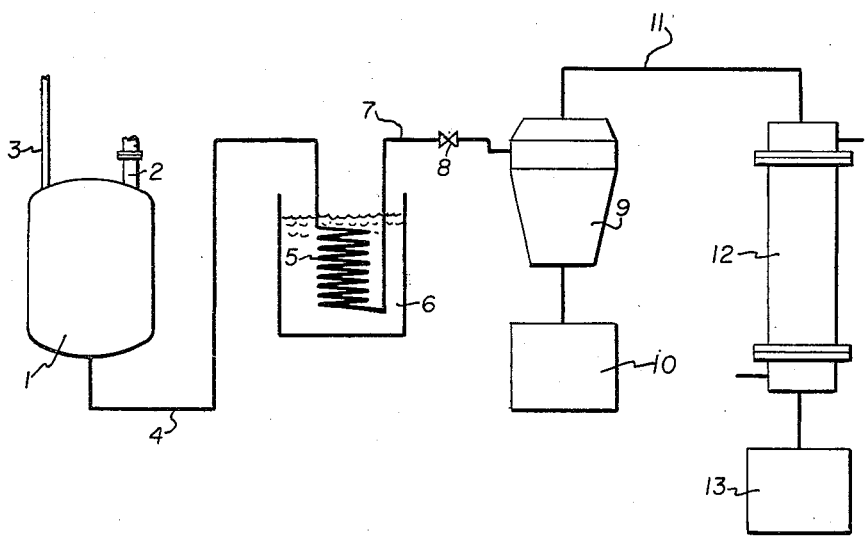
INVENTOR
RICHARD RAYMOND MERNER
BY David Katz.
ATTORNEY Patented Aug. 31, 1954

2,688,038

UNITED STATES PATENT OFFICE 2,688,038

HYDROLYSIS OF METHIONINE NITRILE

Richard R. Merner, New Castle County, Del., assignor to E. I. du Pont de Nemours and Company, Wilmington, Del., a corporation of Delaware Application October 24, 1952, Serial No. 316,693

4 Claims. (Cl. 260—534)

This invention relates to the hydrolysis of alpha - amino - gamma - methylmercapto - butyronitrile (sometimes referred to as methionine nitrile) to the corresponding carboxylic acid (methionine), which is an important dietary supplement.

It is an object of this invention to improve the process of hydrolysis of the aforementioned compound whereby to achieve the same in a very short period and to render the process adaptable to continuous manufacture. A further object is provision of means of purifying the product of volatile impurities, simultaneously with or immediately following the hydrolysis step. Other important objects and advantages of this invention will appear as the description proceeds.

A practical process for the synthesis of methionine consists of bringing about the reaction of acrolein and methyl mercaptan in the presence of pyridine to form beta-methylmercapto-propionaldehyde, treating this aldehyde with hydrogen cyanide to form the corresponding cyanhydrin, and treating the latter with liquid ammonia to form alpha-amino-gamma-methylmercapto-butyronitrile. The above steps have been described in the patent literature. The further step of converting the last-mentioned compound to methionine is described in U. S. P. 2,432,478 and consists of hydrolyzing the nitrile with sulfuric acid of 40 to 60% strength at a temperature of 70° to 150° C., and preferably 90° to 120° C. The hydrolysis then is said to require a period of about 1 to 2 hours. Actually, 3 hours are required at 115° C. to produce results meeting the standard described hereinbelow. Such a long period of hydrtolysis does not lend itself readily to continuous operation. On the other hand, all the prior stages of methionine manufacture are of a rapid nature, and systems have been developed recently for manufacturing this valuable compound on a commercial scale by continuous processes leading from one step to the next.

It is obvious that unless the step of hydrolysis can be improved in respect to duration, it will constitute a bottle-neck on the entire system, and will require equipment of the plant with reaction vessels of large volume for batch operation of the hydrolysis step.

Now I have found that the hydrolysis of methionine nitrile may be effected rapidly and with good yields of high-quality product, if the treatment with sulfuric acid solution (40% to 60% strength) is carried out in a closed vessel at a temperature between 150° and 200° C., and preferably at 165° to 180° C. The effect is most surprising, inasmuch as methionine nitrile is known to be thermally unstable, and all teachings in the literature point to the need of manufacturing this compound and handling it at as low a temperature as possible. Thus, a temperature of —10° C. is recommended for the storage of this compound, in U. S. P. 2,485,236 (Example 3). Degradative decomposition with formation of undesirable by-products was to be expected upon exceeding the upper temperature limit of 150° C. indicated in the prior art. Yet, by working under autogenous pressure (i. e. in a closed vessel) as above indicated, I find that the yield of methionine is essentially the same as obtainable by the best processes of the prior art.

As a standard for comparing yields, I have employed in my researches the process of hydrolysis which works under open reflux at a temperature of 113° C. to 115° C., using sulfuric acid of 50% strength for 3 hours. Although this method is unsatisfactory from the point of view of reaction time, it gives almost complete conversion to methionine.

As already mentioned, the product of my improved hydrolysis process compares favorably in quality with the products obtained at lower temperatures. But to improve the quality further, I add to my process the step of distilling off from 2% to 10% by weight of the entire reaction mass, whereby to eliminate volatile impurities. Otherwise, I have found, these impurities will interfere with the purifying and crystallizing of the methionine. This distillation may be effected at the end of the hydrolysis, in the step of releasing the pressure, or it may be achieved continuously during hydrolysis by bleeding off the pressure continuously through a suitable valve.

Further understanding of my mode of procedure under continuous operation may be obtained from the accompanying drawing which forms an integral part of this specification.

In this drawing, the sole figure constitutes a flow-sheet diagram of the apparatus employed and of the movement of materials.

1 is the supply tank into which the solution of methionine nitrile in sulfuric acid is charged through port 2. The tank also has a nitrogen inlet 3 for building up pressure. A pipe 4 connects the supply tank with the tube-reactor 5 which is immersed in an oil bath 6. Pipe 7 leads through control valve 8 into a cyclone separator 9. From there, the solution of acid and methionine flows into product-receiver 10, while volatile impurities pass on through line 11 and condenser 12 into the volatiles-receiver 13.

The following examples, in which parts are by weight, will serve to illustrate this invention further, without however limiting the same.

*Example 1*

While maintaining the temperature near 25° C., 100 parts of crude methionine nitrile were added to 310 parts of 50% aqueous sulfuric acid. A portion of this solution was then sealed within a Carius tube and plunged into an oil bath adjusted to 165° C. Fifteen minutes later it was withdrawn and immediately cooled. Another portion of the solution was placed in a round-bottomed flask and heated at reflux temperature (about 113° C.), for 180 minutes, after which it was cooled. Analysis indicated a 21.0% content of methionine in the reaction mass hydrolyzed at 165° C., and a 20.5% content in the mass hydrolyzed at 113° C.

Thus, according to the above example, the higher temperature has no detrimental effect on the yield, but shortens the reaction time to about one twelfth of that required at the lower temperature.

*Example 2*

In an agitated, glass-lined pressure vessel, 26.3 parts of crude methionine nitrile and 86.5 parts of 50% sulfuric acid were heated for 15 minutes at 165° C. to 167° C. Volatile impurities were withdrawn continuously through a needle valve to a condenser and amounted to 5 parts. The reaction mass was then cooled. Analysis indicated the presence of methionine in the same amount as was formed by hydrolyzing another sample of the same reaction mass with the same strength acid but at 115° C. and for a period of about 3 hours.

Isolation of the desired product may be achieved as follows: 250 parts of the cooled hydrolysis mass were added slowly to a slurry of 77.5 parts of hydrated lime in 750 parts of water at 70° C. The precipitated calcium sulfate was filtered off, and the filtrate was concentrated to 450 parts, whereupon the pH was adjusted to 5.7 by the aid of sulfuric acid. The concentrate was then decolorized with activated charcoal, and the clarified solution was cooled to crystallize out the methionine. A product of 93% purity, in excellent yield, was obtained.

*Example 3.—(Continuous operation. See drawing)*

A solution of 1 part of crude methionine nitrile in 3.1 parts of 50% aqueous sulfuric acid was prepared at about 25° C. This solution was placed in supply tank 1 and the system was pressurized. The oil bath surrounding reactor 5 was adjusted to the desired temperature and flow of solution was begun. Rate of flow was controlled by valve 8, while the cyclone separator 9 was maintained at atmospheric pressure. The vapor phase thus separated, passed on to condenser 12 while the desired product was collected in receiver 10. The unit was operated at various temperatures and residence times; each time, 5–10% of the mass separated as vapor in the cyclone and was removed as volatile impurity. The data and analytical results are summarized in the following table:

| Temperature | Residence Time, min. | Methionine analysis of the final mass, percent by weight |
|---|---|---|
| 180° C | 2.0 | 19.5 |
| 175° C | 0.8 | 19.1 |
| 170° C | 3.5 | 19.6 |

A control hydrolysis, performed at atmospheric pressure in a balloon flask at 115° C. for three hours to give a maximum yield of methionine, gave an end-solution analyzing 20.7% methionine. The yields by continuous operation are thus sufficiently close to the maximum (obtained by the control experiment) to render the continuous process practical on a commercial scale.

In the above example, the residence times were relatively long for the reason that in the particular apparatus employed the reaction mass moved with a viscous flow. It is possible, however, to design the apparatus so as to produce turbulent flow, whereupon the reaction-time may be considerably shortened. Numerous other variations in detail will be readily apparent to those skilled in the art.

I claim as my invention:

1. The process of producing methionine, which comprises treating alpha-amino-gamma-methyl-mercapto-butyronitrile with aqueous sulfuric acid of 40% to 60% strength, in a closed vessel and at a temperature above 150° C. but not exceeding 200° C.

2. A process as in claim 1 including the further step of distilling off from 2% to 10% of the resulting reaction mass, whereby to eliminate volatile impurities.

3. In the process of producing methionine by hydrolyzing alpha - amino - gamma - methyl-mercapto-butyronitrile with aqueous sulfuric acid of 40% to 60% strength, the improvement which consists of effecting the hydrolysis at a temperature of 165° C. to 180° C., and under autogenous pressure.

4. A continuous process for producing methionine, which comprises feeding continuously methionine nitrile and sulfuric acid of 40 to 60% strength through a pressurized, heated reactor, the rate of feeding being controlled to permit the solution to dwell in the reactor for a period not more than 3.5 minutes and to assume there a temperature between 150° and 200° C., discharging the mass continuously through a pressure-reducing valve into a separator maintained at atmospheric pressure, whereby to distil off from 5 to 10% by weight of the reaction mass, and withdrawing continuously the liquid concentrate from the separator for further treatment to recover methionine therefrom.

References Cited in the file of this patent

UNITED STATES PATENTS

| Number | Name | Date |
|---|---|---|
| 2,432,478 | Lecky | Dec. 9, 1947 |